(12) United States Patent
Petersen et al.

(10) Patent No.: US 6,973,586 B2
(45) Date of Patent: Dec. 6, 2005

(54) SYSTEM AND METHOD FOR AUTOMATIC DYNAMIC ADDRESS SWITCHING

(75) Inventors: David B. Petersen, Great Falls, VA (US); John A. Stanbi, Poughquag, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/134,414

(22) Filed: Apr. 29, 2002

(65) Prior Publication Data

US 2003/0204773 A1 Oct. 30, 2003

(51) Int. Cl.[7] ............................................. G06F 11/00
(52) U.S. Cl. ................. 714/6; 714/7; 709/221
(58) Field of Search ................... 714/6, 7, 11, 12, 714/3; 370/216, 217; 709/220, 221, 222, 709/245

(56) References Cited

U.S. PATENT DOCUMENTS

| | | | |
|---|---|---|---|
| 4,837,680 A | 6/1989 | Crockett et al. | 364/200 |
| 4,894,828 A | 1/1990 | Novy et al. | 371/11.3 |
| 5,289,589 A | 2/1994 | Bingham et al. | 395/425 |
| 5,327,531 A | 7/1994 | Bealkowski et al. | 395/164 |
| 5,720,029 A | 2/1998 | Kern et al. | 395/182.18 |
| 5,828,847 A | 10/1998 | Gehr et al. | 395/200.69 |
| 5,870,537 A | 2/1999 | Kern et al. | 395/182.04 |
| 5,966,301 A | 10/1999 | Cook et al. | 364/132 |
| 6,108,300 A * | 8/2000 | Coile et al. | 370/217 |
| 6,145,066 A | 11/2000 | Atkin | 711/165 |
| 6,167,459 A * | 12/2000 | Beardsley et al. | 710/3 |
| 6,199,074 B1 | 3/2001 | Kern et al. | 707/204 |
| 6,240,467 B1 * | 5/2001 | Beardsley et al. | 710/5 |
| 6,292,905 B1 * | 9/2001 | Wallach et al. | 714/4 |
| 6,442,709 B1 * | 8/2002 | Beal et al. | 714/33 |
| 6,499,112 B1 * | 12/2002 | Milillo et al. | 714/6 |
| 6,578,158 B1 * | 6/2003 | Deitz et al. | 714/11 |
| 6,888,792 B2 * | 5/2005 | Gronke | 370/227 |
| 2003/0018813 A1 * | 1/2003 | Antes et al. | 709/245 |
| 2003/0188233 A1 * | 10/2003 | Lubbers et al. | 714/100 |

* cited by examiner

*Primary Examiner*—Scott Baderman
*Assistant Examiner*—Paul F. Contino
(74) *Attorney, Agent, or Firm*—William A. Kinnaman, Jr.; Cantor Colburn LLP (57) ABSTRACT

A method for automatic peer to peer address switching, comprising: defining a secondary device as a logical alias of a primary device and performing the following steps concurrently for the primary-secondary device pair upon a determination that address switching is desired: terminating the device pair binding, terminating all logical alias bindings to the first device except the logical alias binding of the primary device to the secondary device, preventing the primary device from receiving I/O requests, and allowing the secondary device to receive I/O requests.

21 Claims, 10 Drawing Sheets

SYSTEM AND METHOD FOR AUTOMATIC DYNAMIC ADDRESS SWITCHING

This application is related to U.S. Pat. No. 5,870,537, "Concurrent Switch to Shadowed Device for Storage Controller and Device Errors", assigned to the assignee of the present application, the contents of which are herein incorporated by reference.

CROSS REFERENCE TO RELATED APPLICATIONS

This application is related to United States Patent Application, "System and Method for Concurrent Logical Device Swapping", Ser. No. 10/134,254, filed Apr. 29, 2002 and assigned to the assignee of the present application, the contents of which are herein incorporated by reference.

BACKGROUND

Continuous availability (CA) is the attribute of a system or cluster of systems to provide high availability (i.e., mask unplanned outages from an end-user perspective) and continuous operations (i.e., mask planned maintenance from an end-user perspective). Attempts to achieve these attributes have been made utilizing hardware by enabling a system for redundancy with such mechanisms as multiple servers, multiple coupling facilities (CFS), multiple sysplex timers, multiple channel paths spread across multiple switches, etc. Attempts to achieve these attributes have been made utilizing software by enabling a system for software redundancy with redundant z/OS (IBM's operating system for the mainframe environment that operates on zSeries processor) images and multiple software subsystems per z/OS, etc.

Existing CA systems generally comprise disk subsystems that are a single point of failure. For example, where there is only one copy of disk resident data and the disk subsystem becomes nonfunctional for any reason, the system and/or the applications executing therein typically experience an outage even when the system's other components are redundant or fault tolerant. Some CA systems, including those comprising synchronous disk mirroring subsystems, such as those supporting Peer to Peer Remote Copy (PPRC) functions, reduce the opportunity for outages by having two copies of the data and the cluster spread across two geographical locations.

There are several types of outages that a CA system may experience. A first type of outage is a disk subsystem failure. If a PPRC enabled system experiences a primary disk subsystem failure (i.e., the primary disk subsystem is inaccessible causing an impact on service), required repairs can be performed on the primary disk subsystem while simultaneously performing a disruptive failover to use the secondary disk subsystem. Restoration of service typically requires less than one hour, which compares favorably to non-PPRC systems that typically require several hours before service can be restored. In addition, non-PPRC systems may experience logical contamination, such as permanent Input/Output (I/O) errors, which would also be present on the secondary PPRC volume and would require a data recovery action prior to the data being accessible. For example, IBM DB2 will create a Logical Page List (LPL) entry for each table space that receives a permanent I/O error for which recovery is required. Referring again to a system enabled with PPRC, once the primary disk subsystem is repaired the original PPRC configuration is restored by performing a disruptive switch or using existing PPRC/dynamic address switching functions.

A second type of outage that may be experienced is a site failure wherein the failed site includes disk subsystems necessary for continued operations. When a PPRC enabled system experiences a site failure because for example, z/OS images within a site become nonfunctional or the primary PPRC disk subsystem(s) are inaccessible, the operator on the PPRC enabled system can initiate a disruptive failover to the surviving site and restore service within one hour. When the failed site is restored, the original PPRC configuration is restored by performing a disruptive switch or using existing PPRC/dynamic address switching (P/DAS) functions.

A third type of outage that may be experienced is caused by disk subsystem maintenance. When a PPRC enabled system requires disk subsystem maintenance, there are at least two methods for proceeding. The operator may perform a disruptive planned disk switch to use the secondary disk subsystem restoring service typically in less than one hour. The majority of PPRC systems use this technique to minimize the time when their disaster recovery (D/R) readiness is disabled. The system may also use existing PPRC P/DAS functions to transparently switch the secondary disk subsystem into use.

Existing PPRC and z/OS P/DAS mechanisms, process each PPRC volume pair switch sequentially as a result of z/OS Input/Output Services Component serialization logic thus requiring approximately twenty to thirty seconds to switch each PPRC pair. A freeze function is issued to prevent I/O for the duration of the P/DAS processing due to primary disks being spread across two sites, resulting in the potential for a lack of Disaster Recovery readiness lasting for a significant period of time. For example, assuming that a PPRC enterprise wanted to perform maintenance on one disk subsystem that contained 1024 PPRC volumes and P/DAS were used to perform a transparent switch, the elapsed P/DAS processing time would be equal to 5.7–8.5 hours (1024 volumes * 20–30 seconds processing time per volume pair). Additionally, there are requirements, as described in the IBM publication DFSMS/MVS V1 Advanced Copy Services (SC35-0355), that must be met for P/DAS to work thereby making it very unlikely that a production PPRC disk subsystem pair can be switched using P/DAS without manual intervention. Because many enterprises are unable to tolerate having their D/R readiness disabled for several hours, they often elect to perform a disruptive planned disk switch instead of using the P/DAS function. Once the disk subsystem maintenance is completed, the operator will restore the original PPRC configuration by performing a disruptive switch or use the existing P/DAS function.

An embodiment of the present invention provides a continuous availability solution (in the event of a primary disk subsystem failure and planned maintenance) for transparent disaster recovery for both uni-geographically and multi-geographically located disk subsystems.

SUMMARY

A method for automatic peer to peer address switching, comprising: defining a secondary device as a logical alias of a primary device and performing the following steps concurrently for the primary-secondary device pair upon a determination that address switching is desired: terminating the device pair binding, terminating all logical alias bindings to the first device except the logical alias binding of the primary device to the secondary device, preventing the primary device from receiving I/O requests, and allowing the secondary device to receive I/O requests.

DETAILED EMBODIMENT

Peer-to-Peer Dynamic Address Switching (P/DAS) is a z/OS operating system function based on Dynamic Device Reconfiguration (DDR) and Peer-to-Peer Remote Copy (PPRC). It provides a means for installations to non-disruptively switch between devices in a duplex pair when the primary device needs to be made unavailable for reasons such as performing service or migrating from one subsystem to another. P/DAS requires a device to be released (i.e. not actively reserved) prior to P/DAS's execution of operations on the device. P/DAS performs various operations serially (i.e. operates on one device pair at a time) in order to manage the PPRC state of a set of devices. When a Geographically Dispersed logical subsystem is utilized by an enterprise, a common solution for completing P/DAS functions is to suspend or terminate the applications requiring I/O access to data stored on the devices, perform operations including breaking the PPRC connections among the devices, and restarting the applications whereby the application's I/O access requests are redirected to the secondary volumes. These operations generally require approximately fifteen seconds per device, plus one to two additional seconds for each system comprising the cluster. As a result, several thousand PPRC pairs, for example, will exceed the maximum amount of allotted time for continuous availability system requirements. In addition, PIDAS requires automation routines to provide multi-system serialization via the IOACTION operator command in order to provide a synchronization point for all systems to switch devices at the same time in order to insure data consistency.

In addition to PPRC, RAID5 disk subsystems may be used to provide for fault tolerance. However, RAID subsystems are also subject to failure. Such failures may be due to errors in Licensed Internal Code (LIC, or micro-code) which is itself a single point of failure. Additionally, a typical RAID5 disk subsystem is deployed to a single geographic location and thus is not likely to withstand geographical disasters (e.g. earth quakes, floods, bombs, etc.).

An embodiment of the present invention provides for improving CA and D/R attributes by masking logical subsystem outages while eliminating the need for several P/DAS requirements. A feature of an embodiment of the present invention is to provide a higher rate of recovery from system failures by parallelizing the existing P/DAS recovery and by requiring less system serialization resulting from the removal of the requirement of using DDR for its switch-over capability. Another feature of an embodiment of the present invention is to provide transparent recovery for disk subsystem failures. An additional feature of an embodiment of the present invention is to enable a disk subsystem located in multiple geographical locations for in-parallel switching of all primary PPRC devices to all secondary PPRC devices in a minimal of time without disrupting applications requiring access to the disk subsystem. An additional feature of an embodiment of the present invention is the ability to direct certain read I/O requests to secondary devices. In contrast, current systems require that I/O operations must be sent to a primary device for execution thereby resulting in a certain amount of latency especially where the primary device is remotely located from the source of the I/O request. It is understood that these features are merely exemplary and not intended to limit embodiments of the invention.

For purposes of clarity and explanation, "in-parallel" (hereinafter "concurrent") computer applications, programs, tasks, operations, and/or processes refers to the concurrent execution of two or more of the same. Furthermore, it is understood to one of ordinary skill in the art that concurrency may be synchronous or asynchronous and that computer applications, programs, tasks, operations, and/or processes may initiate, execute, and terminate independent of one another.

An exemplary embodiment of the present invention includes the creation a single logical volume comprising primary and secondary devices without requiring a pseudo-online state and without requiring the swapping of UCB contents (subchannel number, CHPIDS, etc . . . ). Single logical volumes allow secondary devices to execute read-only requests when the I/O requestor does not require extent serialization. Thus, the single logical volumes construct of this exemplary embodiment improves performance by eliminating queue time when there are not enough aliases to execute waiting requests on the primary device alone.

In addition, an exemplary embodiment of the present invention provides for improved system performance through the service of read requests by secondary devices prior to an event requiring recovery.

An exemplary embodiment of the present invention does not require high level automation to respond to messages (IOS002A) and execute a response, and instead includes the flipping of bits on or off to block I/O to primary (base) devices and to route requests to secondary alias devices. For example, when the first device experiences an error (i.e. non operational condition), the flipping of bits causes the IOS to block I/O to the base, allow I/O to alias, and depend on the terminate pair PSF CCW command to be broadcast to all sharing systems to the secondary device. When the terminate pair CCW is executed the primary device presents a device state transition (DST) interrupt to all sharing systems, before accepting any other commands. This DST interrupt notifies the systems that they need to check the state of the devices and perform address switching if secondaries have become active.

An exemplary embodiment comprises an "IBM S/390" type computer system including at least one logical subsystem wherein the logical subsystem's devices are located in one or more geographical locations. Moreover, an exemplary computer system is enabled for using a Parallel Access Volume-Alias (PAV-Alias). It is understood that a PAV-Alias as described in the present application is an example of a logical device alias and that any system enabled for using any logical device alias construct or the equivalent thereof may be used without exceeding the scope of the present application. While for purposes of explanation and example, FIGS. 6 through 10 show exemplary steps for a single computer system comprising a single logical volume, it is understood that the embodiment envisioned by FIGS. 1 through 10 comprise multiple computer systems and multiple logical volumes. It is further understood that the combination of a PAV-Base device and at least one PAV-Alias device may be referred to as a logical volume. An alternate embodiment may be implemented concurrently and in-parallel across multiple computer systems and multiple logical volumes.

Figure 1:
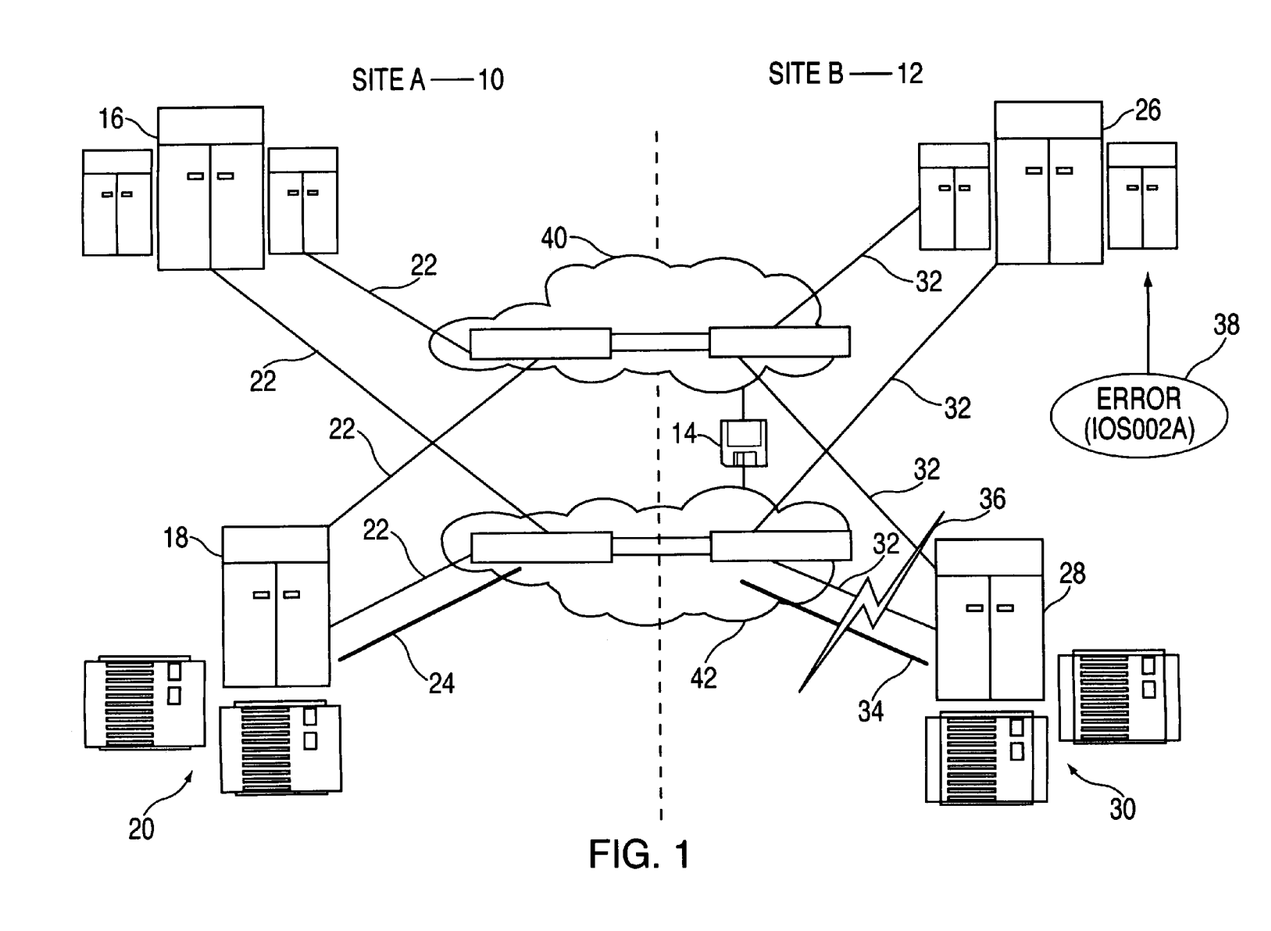
FIG. 1 shows an exemplary system including geographically dispersed logical volumes.

FIG. 1 shows an exemplary system including geographically dispersed logical volumes. Site A at 10 includes computers/processors 16 and storage devices 18, 20 connected to data networks 40, 42 via data communications lines 22. Site B at 12 includes computers/processors 26 and storage devices 28, 30 connected to data networks 40, 42 via data communications lines 32. The storage devices of site A at 18, 20 and site B at 28,30 are also in communication via PPRC links 24, 34. It is understood that PPRC links 24 and 34 are exemplary and the lack thereof does not exceed the scope of the present disclosure. Under exemplary circumstances wherein primary storage devices 28, 30 are located at site B at 12, a failure 36 is detected from Input/Output Supervisor (IOS) symptoms such as those causing IOS002A message 38 indicating that storage devices 28, 30 do not have operational paths with which to communicate with the remainder of the geographically dispersed storage subsystem. In an exemplary embodiment, computer program code for automatic dynamic address switching is located in a computer usable storage medium 14 that is in communication with and accessible by at least one computer/processor 16, 26 via a propagated data communication signal.

Figure 2:
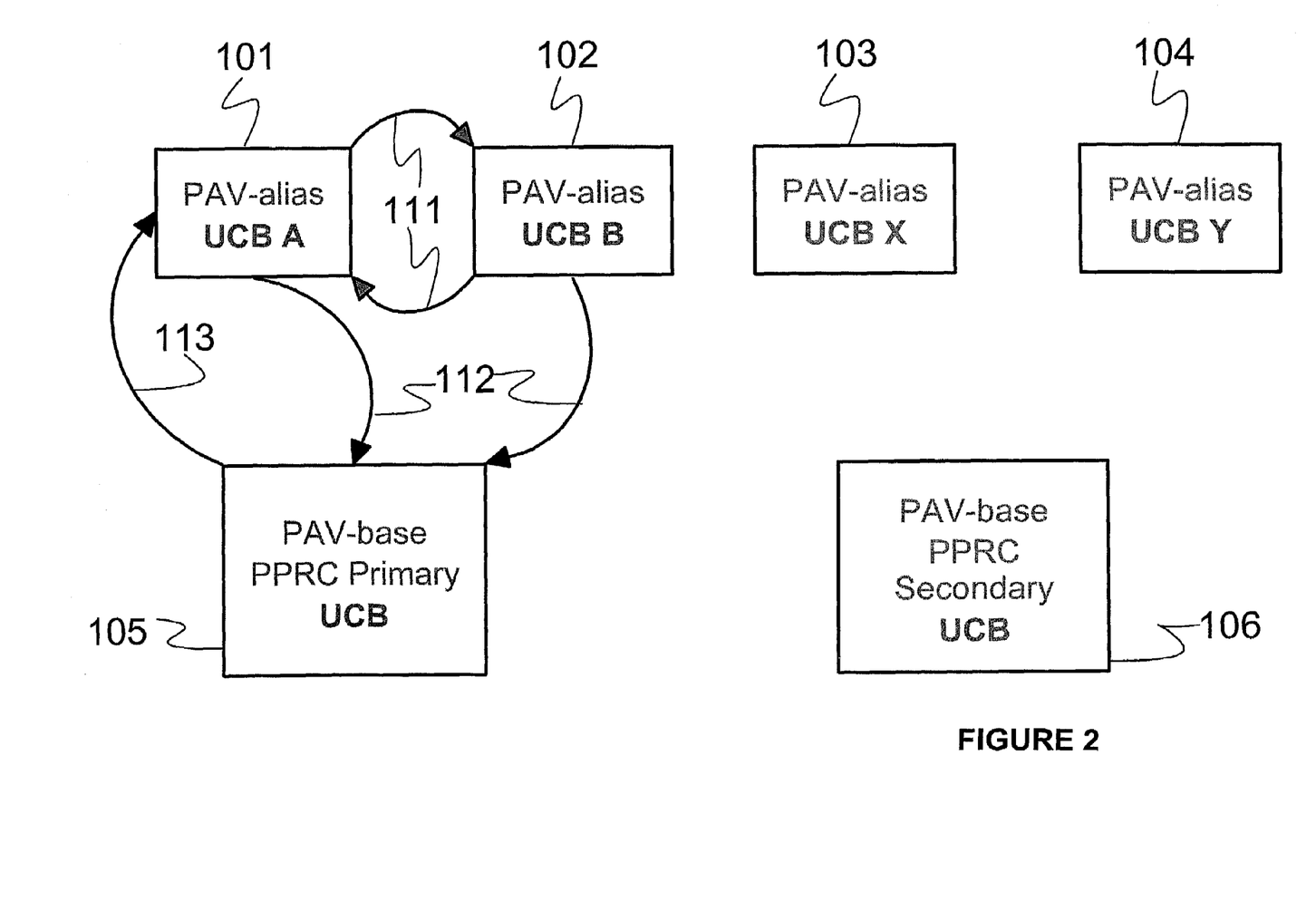
FIG. 2 shows exemplary logical volumes during initialization.

FIG. 2 shows exemplary logical volumes during initialization. PAV-Base 105 UCB and PAV-Alias 101,102 UCBs are bound together during system initialization to form a single logical volume for scheduling I/O requests. I/O can be started over any free PAV-Base or PAV-Alias to a PAV device. A PAV-Base 105 UCB contains the device number that is surfaced to the systems operator and applications as the device number representing the logical volume. A device number is a four digit hexidecimal number that is used to uniquely identify a device to the operating system and machine. PAV-Alias 101, 102 UCBs represent alias unit addresses that are defined in the DASD subsystem to allow access to the same logical volume. The PAV-Base points 113 to the first PAV-Alias on the PAV-Alias queue 111. PAV-Aliases are formed into a circular queue 111 in order to easily be able to find all PAV-Aliases for a single logical volume. Each PAV-Alias 101, 102 point, 112 back to the PAV-Base 105 device that they are associated with in order to be able to quickly process interrupts and errors when I/O operations complete.

The PPRC secondary device 106 is also defined (to the operating system) as a PAV-Base, however, the PPRC secondary device is not yet brought online or made eligible for I/O operations (i.e. normal reads/writes are rejected with unit check status and sense data indicating the device is a PPRC secondary). For purposes of this invention a PPRC secondary device bound as a PAV-Alias may be hereinafter be referred to as a PAV-Secondary. The PAV-Secondary 106 also has a set of PAV-Alias devices 103, 104 that will be used when the secondary device is set to a usable state known as a simplex state after a system error causing event occurs, however they are not initially bound to either the PAV-Base 105 or the PAV Secondary 106.

Figure 3:
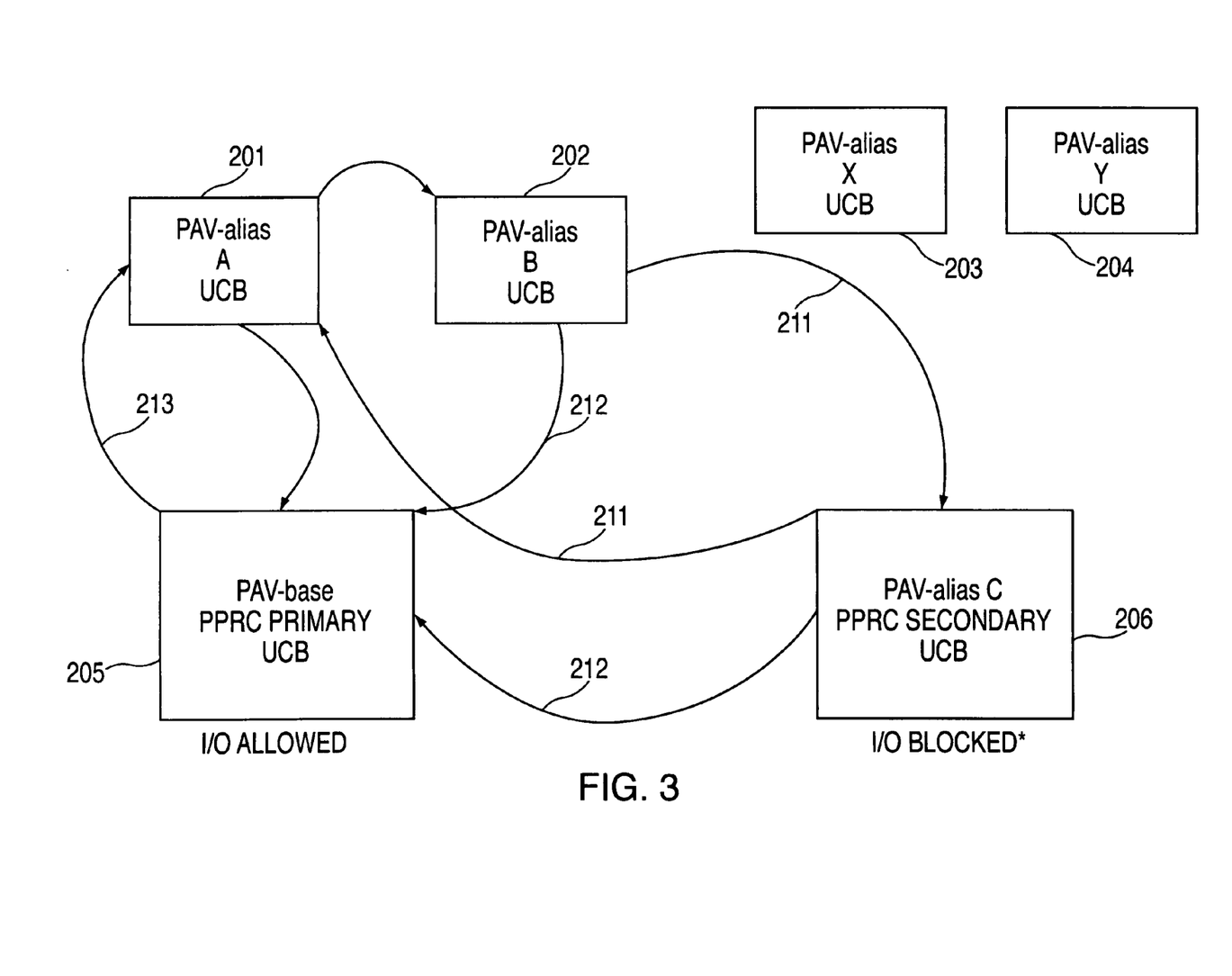
FIG. 3 shows exemplary logical volumes during initialization.

FIG. 3 also shows exemplary logical volumes during initialization. During system initialization or after a device is varied online and after PAV-Aliases are bound to the PAV-Base as shown in FIG. 2, each PPRC secondary device 206 that is defined as a PAV-Base device (PAV secondary) is bound 212 to its corresponding PPRC primary device 205 as if the PPRC secondary device 206 were a PAV-alias device and the corresponding PPRC primary device 205 were defined as a PAV-base device. This binding process is accomplished by extending the PAV-Alias circular queue 211 to include the PAV-Alias device 206. The PAV-Secondary device 206 UCB is then updated to point 212 to the PAV-Base PPRC primary device 205. The UCB Look Up Table entry for the PPRC secondary 205 is updated to indicate the UCB is now PAV-Alias C so that it won't be found by applications searching for PAV-Base UCBs. A PAV-Base UCB for a secondary device is referred to as a PAV-Secondary UCB.

Once the PAV-Secondary device (PPRC secondary) 206 has been bound to the PPRC primary device 205, a Perform Subsystem Function (PSF) command is issued to the PPRC secondary device 206 to instruct it that it can accept and execute read requests that do not require extent serialization. Extent serialization is an attribute of the Extended Count-Key Data (ECKD) architecture where two or more channel programs that access the same tracks (extents) on the same disk cannot execute concurrently if either channel program allows for a write. ESS (shark) allows for applications to bypass extent serialization in case where the application guarantees the required serialization this bypass allows for a reduction in overhead. For a further discussion of extent serialization U.S. Pat. No. 6,240,467, the contents of which herein incorporated by reference, may be reviewed. The PPRC secondary device 206 UCB is then marked as "blocked" so that only I/O requests that are "read only" and do not require extent serialization may be executed.

Figure 4:
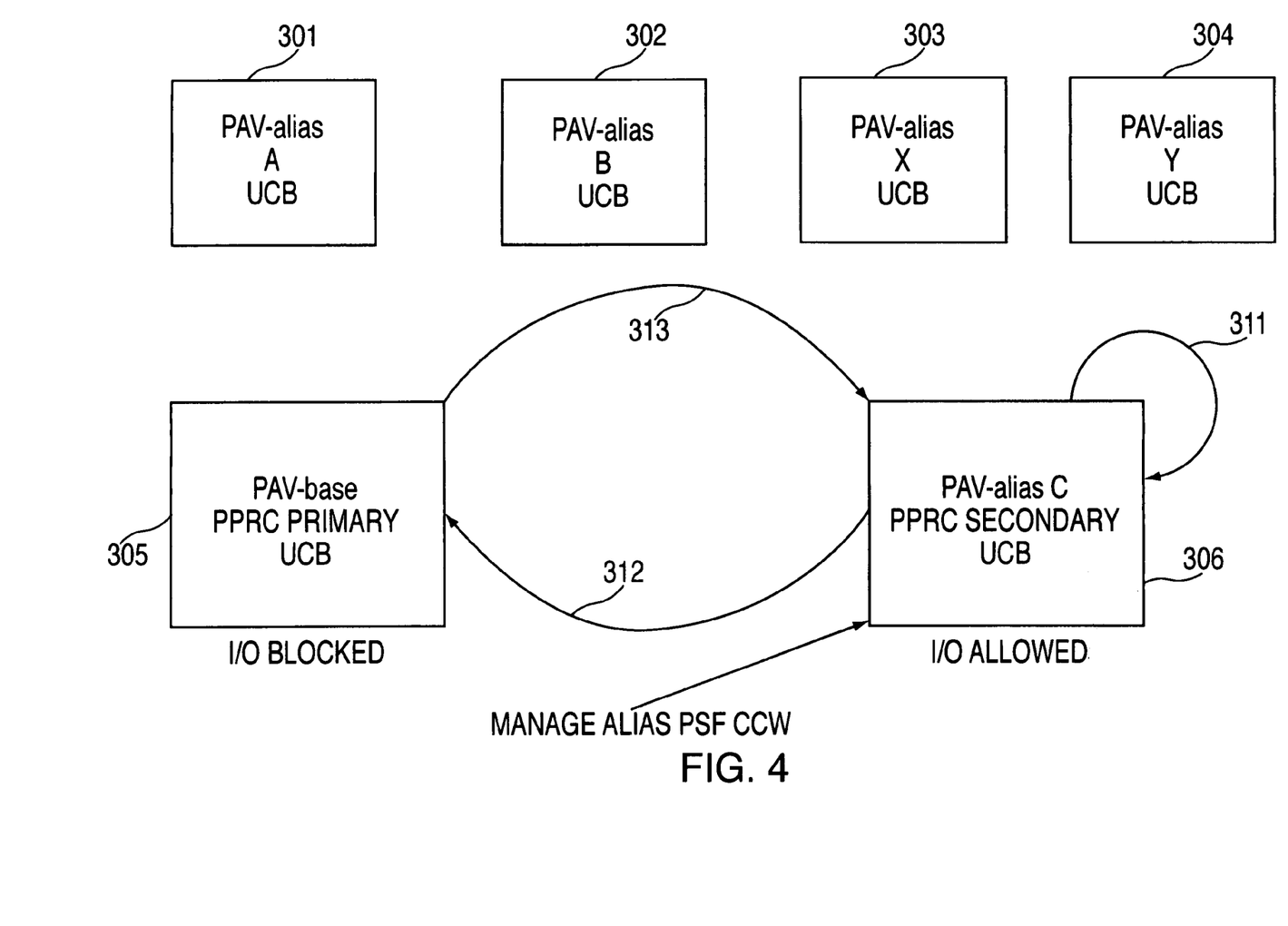
FIG. 4 shows exemplary logical volumes during address switching.

FIG. 4 shows exemplary logical volumes during operation. Once a permanent I/O error is received for a device, a recovery process is initiated. The current PAV-Alias devices 301, 302 UCBs are unbound from the PAV-Base device 305 (PPRC primary). The PPRC secondary device 306 UCB remains as the only PAV-Alias bound to the PAV-Base device 305 (PPRC primary). The circular queue for the PAV-Aliases contains only PAV-Secondary 311. The terminate PPRC pair PSF command is issued to the PPRC secondary device 306 in order to break the PPRC pair and set it into the simplex state. The PAV-Base device 305 UCB is marked so that no I/O requests can be executed to it. The PAV-Secondary device 306 (former PPRC secondary, now simplex state) is now marked as unblocked so that all I/O requests can be started. The Manage Alias PSF command is issued to the PAV-Alias device 306 in order to force a device state transition from every PAV-Alias associated with it. Each PAV-Alias device presents an interrupt 303, 304 and is bound to the PAV-Base device 305, which now corresponds to the PAV-Alias device 306.

Figure 5:
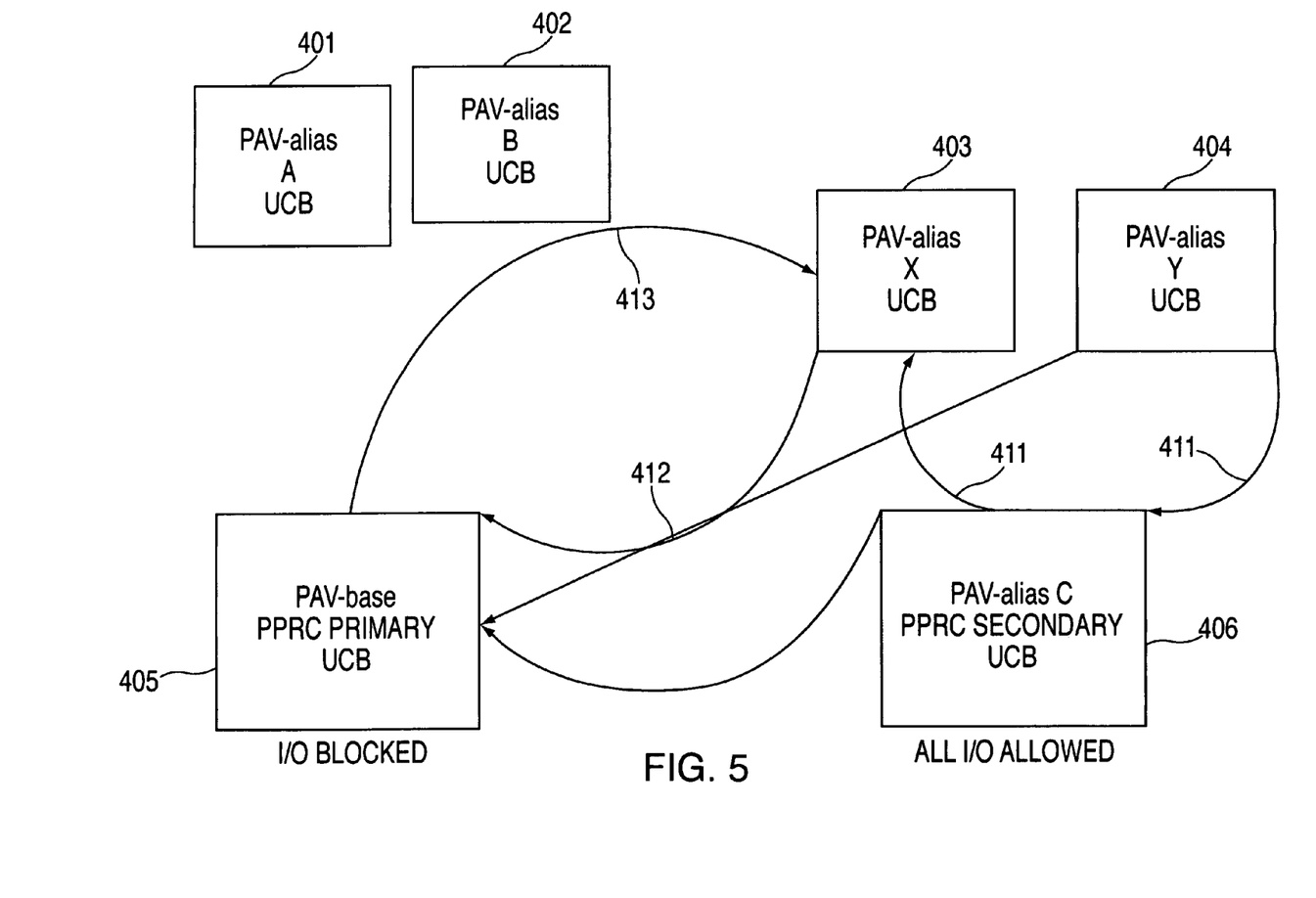
FIG. 5 shows exemplary logical volumes during address switching.

FIG. 5 also shows exemplary logical volumes during operation. PAV-Alias devices 403, 404 have been bound to the PAV-Base device 405 that includes the PAV-Alias 406 (former PPRC secondary). All I/O requests from applications allocated to the PAV-Base device 405 (former PPRC primary) are now directed to the former PPRC secondary device 406 and all of its PAV-Alias devices 403, 404.

Figure 6:
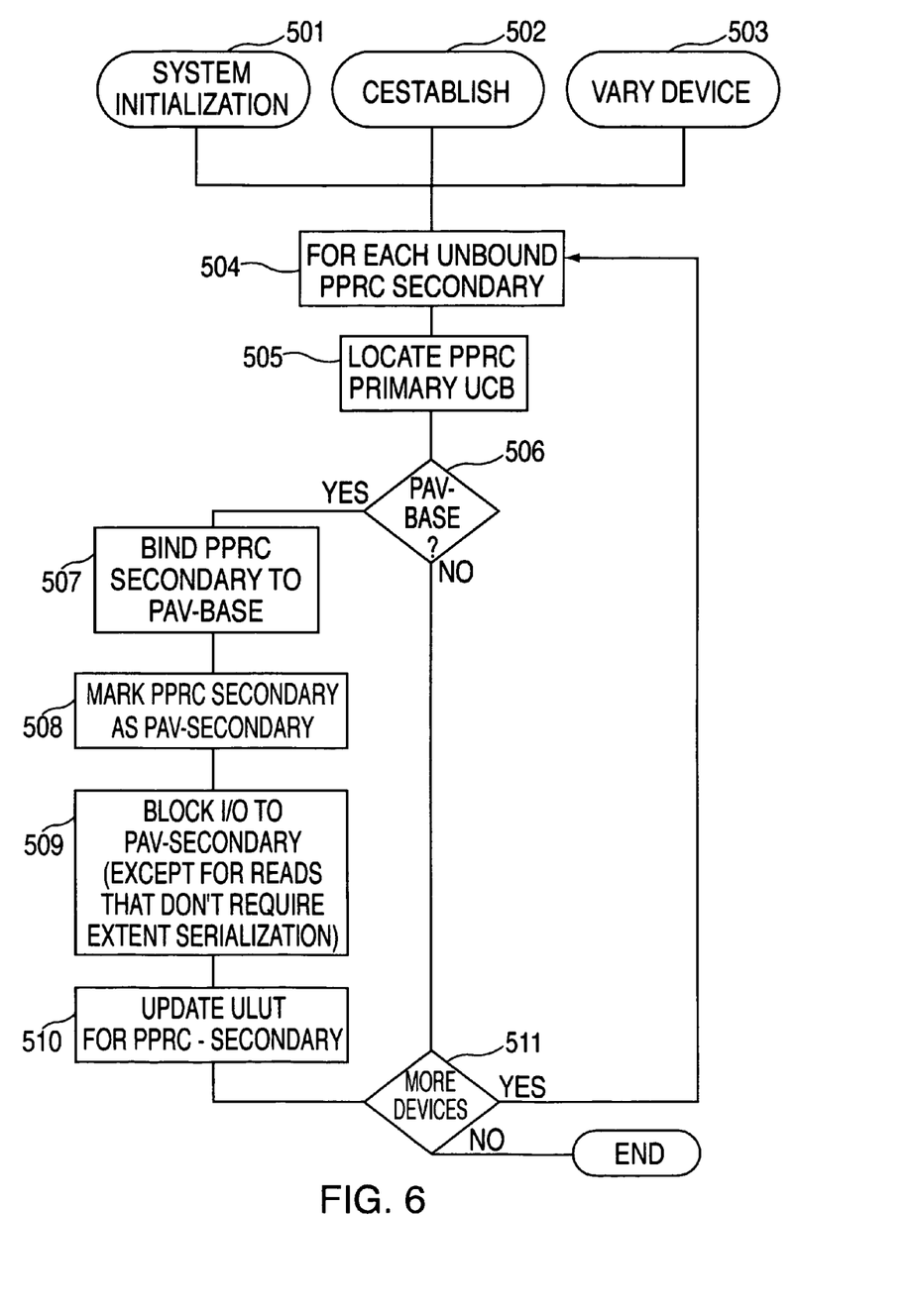
FIG. 6 is a flow chart of an exemplary initialization process.

FIG. 6 is a flow chart of an exemplary initialization process in accordance with the present invention. During system initialization at 501, after all the PAV-Alias devices have been processed (bound to their corresponding PAV-Bases) following the establishment of a PPRC device pair at 502, or after a PPRC primary device is varied online at 503, the operating system locates the PPRC secondary devices to initialize. The Input/Output Supervisor (IOS) component of the operating system finds every PPRC secondary device located at 504. For each unbound PPRC secondary device located at 504, the corresponding PAV-Base UCB for the PPRC primary device is located at 505. If there is no PPRC primary, or the PPRC primary is not defined to be a PAV-Base device UCB at 506, the PPRC secondary device is ignored and processing continues to the next PPRC secondary device at 511. Once all the PPRC secondary devices have been processed, processing terminates.

If a PAV-Base UCB for the PPRC primary device is found at 506 the PAV-Base PPRC secondary UCB is bound to the PAV-Base at 507 as described for FIG. 2. Next, the PPRC secondary device is marked as a PAV-Secondary device UCB at 508. The PAV-Secondary UCB is marked at 509 such that all I/O to the PAV-Secondary UCB except read-only requests that do not require extent serialization are prevented by alternating flag bit in the I/O request block. The UCB Look Up Table entry for the PPRC secondary device is updated to mark the PAV-Secondary device as a PAV-Alias device at 510 so that the UCB is not findable by applications. If it is determined that there are additional devices at 511, steps 504–510 are repeated for each such determined device. It is understood that the initialization steps described herein are completed prior to the occurrence of a failure requiring a recovery and thereby reduce the number of steps and the amount of time necessary for recovery from the failure.

Figure 7:
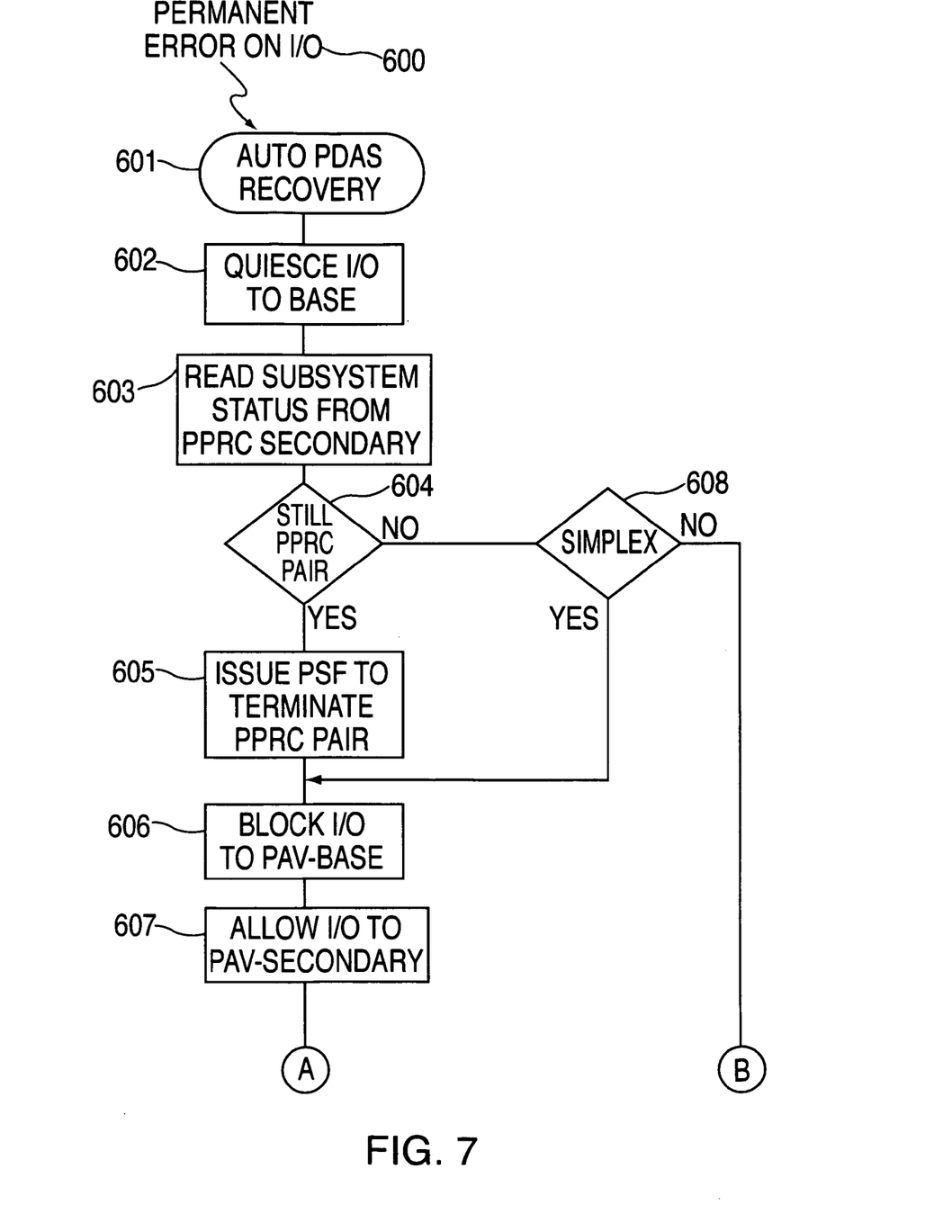
FIGS. 7 and 8 comprise a flowchart of an exemplary address switching process.
Figure 8:
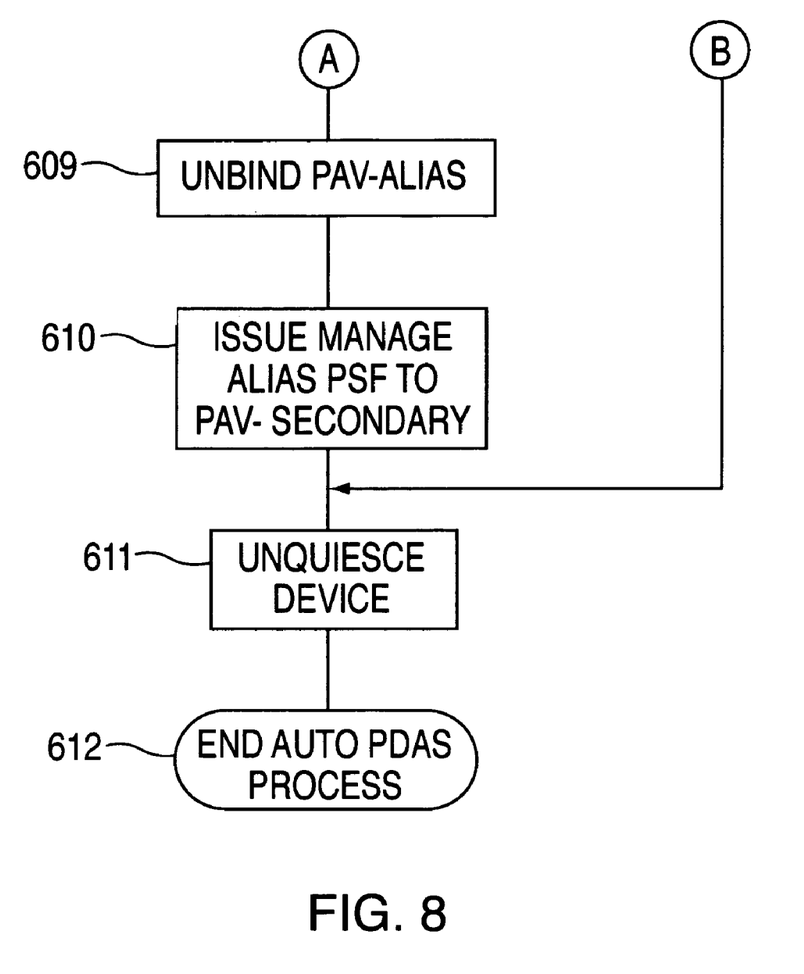

FIGS. 7 and 8 comprise a flowchart of an exemplary recovery process in accordance with the present invention. The first host computer system (sharing access to the devices being recovered) to detect a permanent I/O error (e.g. deferred condition code 3 for application I/O request 600) begins a recovery process at 601. The PAV-Base UCB is quiesced at 602 so that no new I/O requests can be started to the logical volume. A read-subsystem-status PSF command is issued to the PAV-Secondary UCB at 603 to determine the state of the device. If the PAV-Secondary is still in a PPRC pair with the primary at 604 then the terminate pair PSF is issued at 605. The sharing systems will see a device state transition when the PPRC pair is broken. After the terminate pair PSF is issued at 605, all future I/O is blocked to the PAV-Base at 606 and all I/O is now allowed to the PAV-Secondary at 607. Next, all current PAV-Alias UCBs, except for the PAV-Secondary UCB are unbound at 609. The manage alias PSF is then issued to the PAV-Secondary device at 610 in order to force a device state transition from all the PAV-Alias UCBs for the PAV-Secondary device. This causes interrupts to be presented for the PAV-Alias devices so that they can become bound to the PAV-Secondary. The device is unquiesced (I/O activity is allowed to resume) at 611.

If the device was not found to be a PPRC pair at 604 but is found to be in the simplex state at 608, another sharing system must have issued the terminate pair PSF first. In such a case, processing continues beginning with step 606 and as described above. If the device state could not be determined at 608 processing continues beginning with step 611 and as described above.

Figure 9:
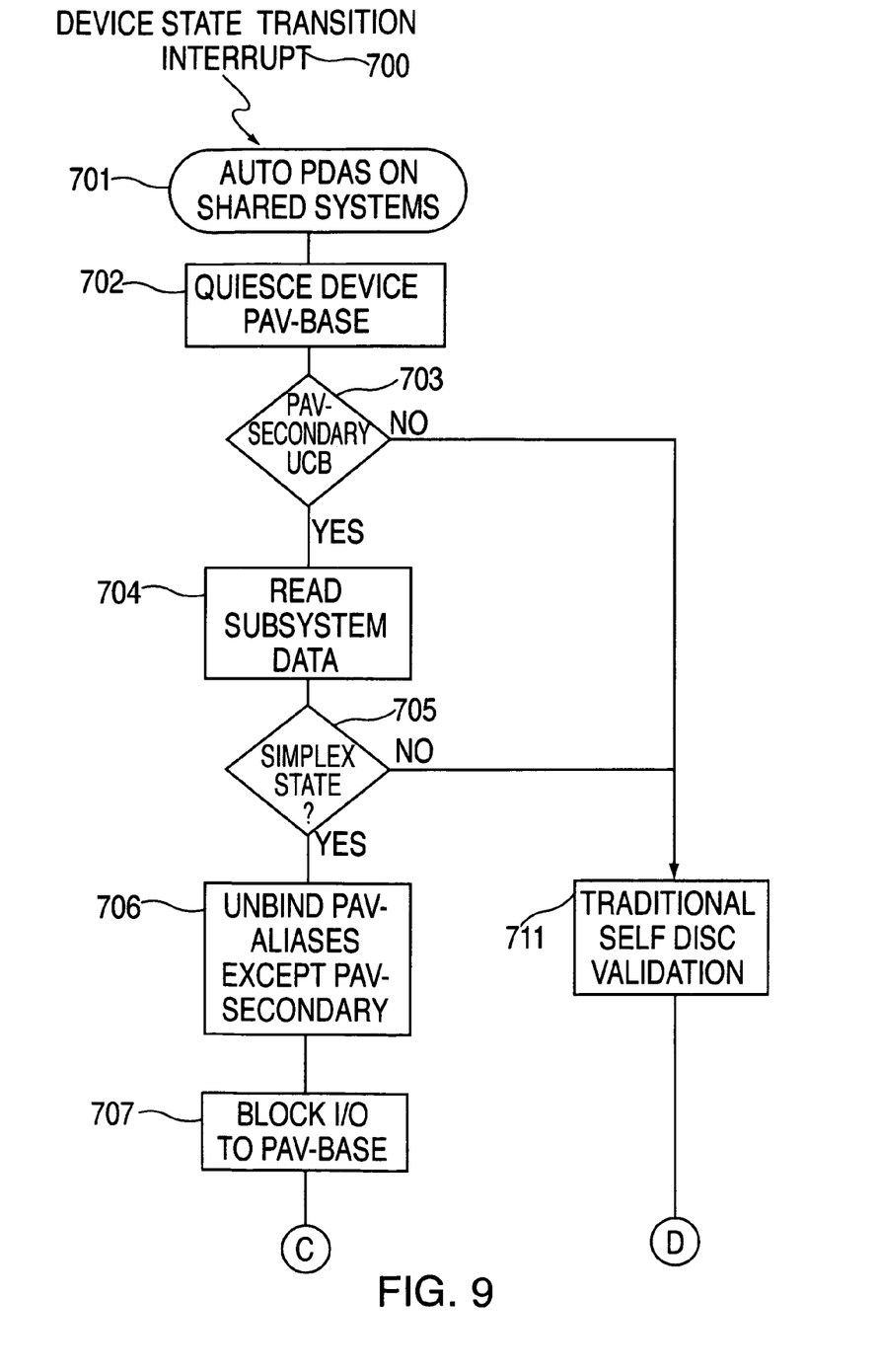
FIGS. 9 and 10 comprise a flowchart of additional exemplary steps for the address switching process shown in FIGS. 7 and 8.
Figure 10:
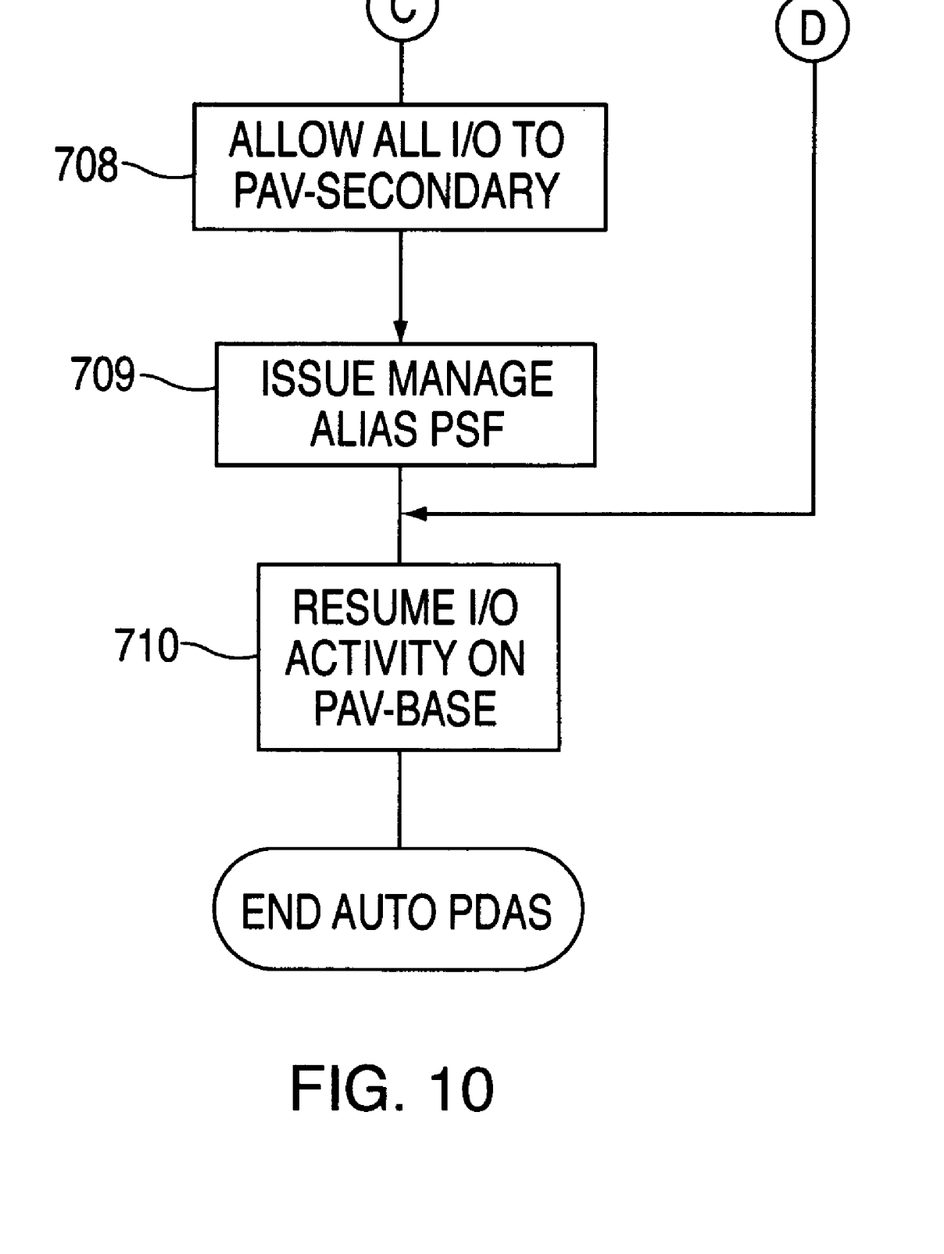

FIGS. 9 and 10 comprise a flowchart of additional exemplary steps for the recovery process of FIGS. 7 and 8. When the PPRC pair is terminated by issuing the terminate pair PSF (shown at step 605 of FIG. 7), all systems with access to the device receive a device state transition interrupt at 700. The interrupt handler gets control at 701 and quiesces the PAV-Base UCB at 702 so that no application I/O requests can be started for the logical volume. If it is determined that the interrupt occurred on a PAV-Secondary UCB at 703 then the read-subsystem-data PSF is issued at 704 to determine if the PAV-Secondary is still in a PPRC pair. If the PAV-Secondary is not determined to be in a PPRC pair at 705 then all PAV-Alias UCBs, except for the PAV-Secondary, are unbound from the PAV-Base at 706. All future I/O requests are blocked from executing to the PAV-Base at 707 (and similar to step 606). Next, the PAV-Secondary UCB is marked to allow future I/O requests to execute to the PAV-Secondary at 708. The manage alias PSF command is issued at 709 to force a device state transition from all the PAV-Alias UCBs for the PAV-Secondary device. The device is unquiesced to resume application I/O for the logical volume at 710.

If it is determined that the interrupt did not occur on a PAV-Secondary UCB at 703 or if the PAV-Secondary is determined to be in a PPRC pair at 705, traditional processing at 711 is performed. Traditional processing consists of validating the device self description data for currently bound PAV-Alias UCBs to verify that the UCBs are bound to the current logical volume. If the device state transition occurred for an unbound PAV-Alias UCB, the correct PAV-Base is found and the PAV-Alias is bound to it. When PAV-Secondary UCBs are active (I/O is allowed), PAV-Alias UCBs for the PAV-Secondary are bound to the PAV-Base that also binds the PAV-Secondary. Upon completion of traditional processing, processing continues beginning with step 710 and as described above.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for automatic peer to peer address switching, comprising:
   performing an initialization for at least one primary-secondary device pair, the initialization including:
   defining said second device as a logical alias of said first device, said first device being a primary device of said device pair and said second device being a secondary device of said device pair, said primary device and said secondary device forming said device pair, and
   preventing said second device from accepting I/O requests; and
   performing an address switching for said primary-secondary device pair upon a determination that said address switching is desired, the address switching including:
   terminating said device pair binding,
   terminating all logical alias bindings to said first device except said logical alias binding of said first device to said second device,
   preventing said first device from receiving I/O requests, and
   allowing said second device to receive I/O requests.

2. A method as in claim 1 wherein said initialization is performed concurrently for multiple device pairs.

3. A method as in claim 1 wherein said address switching is performed concurrently for multiple device pairs.

4. A method as in claim 1 wherein said device pair is a PPRC device pair.

5. A method as in claim 1 wherein said first device is a PAV-Base to said second device and said second device is a PAV-Alias to said first device.

6. A method as in claim 1 wherein said second device is defined as a PAV-Secondary to said first device.

7. A method as in claim 5 wherein said second device is a PAV-Base to at least one PAV-Alias.

8. A method as in claim 7 wherein said initialization further comprises terminating the logical binding of said as PAV-Base to said PAV-Alias.

9. A method as in claim 8 wherein said address switching further comprises binding said unbound PAV-Alias to said first device.

10. A method of using a PPRC secondary device to respond to read requests, comprising:
    setting said PPRC secondary device as a PAV-Secondary device for a PPRC primary device, said PPRC primary device being defined as a PAV-Base and being bound to a first set of PAV-Alias devices, said PPRC secondary device having defined a second set of PAV-Alias devices said secondary device not being in an online state prior to said setting;
    including said PAV-Secondary device in a PAV-Alias queue, said PAV-Alias queue being a PAV-Alias queue for said PAV-Base device;
    updating a UCB lookup entry, said update indicating that said PPRC secondary device is defined as a PAV-Alias; and
    instructing said PPRC secondary device to accept and respond to read requests.

11. A method as in claim 10 wherein said PPRC secondary device accepts and responds only to read requests not requiring extent serialization.

12. A method for automatic peer to peer address switching, comprising:
    performing an initialization for at least one PPRC device pair, the initialization including:
    setting said PPRC secondary device as a PAV-Secondary device for a PPRC primary device, said PPRC primary device being defined as a PAV-Base and being bound to a first set of PAV-Alias devices, said PPRC secondary device having defined a second set of PAV-Alias devices said secondary device not being in an online state prior to said setting,
    including said PAV-Secondary device in a PAV-Alias queue, said PAV-Alias queue being a PAV-Alias queue for said PAV-base device, and
    updating a UCB lookup entry, said update indicating that said PPRC secondary device is defined as a PAV-Alias; and
    performing an address switching for said PPRC device pair upon a determination that said address switching is desired, the address switching including:
    unbinding said first set of PAV-Alias devices from said PAV-Base,
    terminating a PPRC binding, said PPRC binding defining said PPRC primary device and said PPRC secondary device as a PPRC pair,
    blocking I/O requests directed to said PAV-Base, and
    allowing I/O requests to said PAV-Secondary.

13. A method as in claim 12 wherein said initialization is performed concurrently for multiple device pairs.

14. A method as in claim 12 wherein said address switching is performed concurrently for multiple device pairs.

15. A method as in claim 12, wherein said initialization further comprises instructing said PPRC secondary device to accept and respond to read requests.

16. A method as in claim 15 further wherein said PPRC secondary device accepts and responds only to read requests not requiring extent serialization.

17. A method as in claim 12 wherein address switching further comprises including said second set of PAV-Alias devices in said PAV-Alias queue.

18. A system for automatic peer to peer address switching, comprising:
    a first device and a second device, said first device being a PPRC primary device, said second device being a PPRC secondary device, said PPRC primary and said PPRC secondary devices being a PPRC device pair; and
    at least one processor, said processor being in communication with said PPRC primary device and said PPRC secondary device, said processor for executing computer program code for performing automatic address switching; and
    computer program code for performing the following steps:
    setting said PPRC secondary device as a PAV-Secondary device for a PPRC primary device, said PPRC primary device being defined as a PAV-Base and being bound to a first set of PAV-Alias devices, said PPRC secondary device having defined a second set of PAV-Alias devices, said PPRC secondary device not being in an online state prior to said setting,
    including said PAV-Secondary device in a PAV-Alias queue, said PAV-Alias queue being a PAV-Alias queue for said PAV-Base device,
    updating a UCB lookup entry, said update indicating that said PPRC secondary device is defined as a PAV-Alias, and
    unbinding said first set of PAV-Alias devices from said PAV-Base,
    terminating a PPRC binding, said PPRC binding defining said PPRC primary device and said PPRC secondary device as a PPRC pair, blocking I/O requests directed to said PAV-Base, and allowing I/O requests to said PAV-Secondary.

19. An article of manufacture comprising:

a computer usable medium having computer readable program code for performing automatic peer to peer address switching, said computer readable program code further comprising computer readable program code for:

performing an initialization for at least one PPRC device pair, the initialization including:

setting a PPRC secondary device as a PAV-Secondary device for a PPRC primary device, said PPRC primary device being defined as a PAV-Base and being bound to a first set of PAV-Alias devices, said PPRC secondary device having defined a second set of PAV-Alias, said PPRC secondary device not being in an online state prior to said setting, including said PAV-Secondary device in a PAV-Alias queue, said PAV-Alias queue being a PAV-Alias queue for said PAV-base device, and updating a UCB lookup entry, said update indicating that said PPRC secondary device is defined as a PAV-Alias; and performing an address switching for said PPRC device pair upon a determination that said address switching is desired, said address switching including:

unbinding said first set of PAV-Alias devices from said PAV-Base, and terminating a PPRC binding, said PPRC binding defining said PPRC primary device and said PPRC secondary device as a PPRC pair, blocking I/O requests directed to said PAV-Base, and allowing I/O requests to said PAV-Secondary.

20. A article of manufacture as in claim 19 wherein said initialization is performed concurrently for multiple device pairs.

21. A article of manufacture as in claim 19 wherein said address switching is performed concurrently for multiple device pairs.

* * * * *